United States Patent

Fukunaga et al.

[11] Patent Number: 5,841,465
[45] Date of Patent: Nov. 24, 1998

[54] LIGHT BEAM FOCAL POSITION DETECTING DEVICE, LIGHT BEAM PROJECTING DEVICE, AND LIGHT BEAM RECORDING APPARATUS

[75] Inventors: Hideki Fukunaga; Shoji Yamaguchi; Takashi Nomiyama, all of Nakai-machi, Japan

[73] Assignee: Fuji Xerox Co., Ltd., Tokyo, Japan

[21] Appl. No.: 725,324

[22] Filed: Oct. 2, 1996

[30] Foreign Application Priority Data

Sep. 29, 1995 [JP] Japan .................................. 7-252300

[51] Int. Cl.⁶ ............................................ B41J 2/47
[52] U.S. Cl. ............................................ 347/258
[58] Field of Search ................................ 347/242, 256, 347/257, 258, 134

[56] References Cited

U.S. PATENT DOCUMENTS 4,198,154  4/1980  Masegi et al. ........................ 347/134
4,530,080  7/1985  Aoi et al. ............................... 347/242

FOREIGN PATENT DOCUMENTS

A-60-100113  6/1985  Japan .
A-2-140710   5/1990  Japan .
A-2-289812  11/1990  Japan .

Primary Examiner—Mark J. Reinhart
Attorney, Agent, or Firm—Oliff & Berridge, PLC

[57] ABSTRACT

A light beam focal position detecting device for detecting the focal position of a scanning light beam to correct the focal error on the photosensitive drum surface includes a photosensor which is placed at a position on the light beam axis before or after the expected focal position and made up of a pair of rectangular opto-electric transducers having their confronting sides extending along the main scanning direction or a plurality of opto-electric transducers arrayed along the subordinate scanning direction.

17 Claims, 17 Drawing Sheets

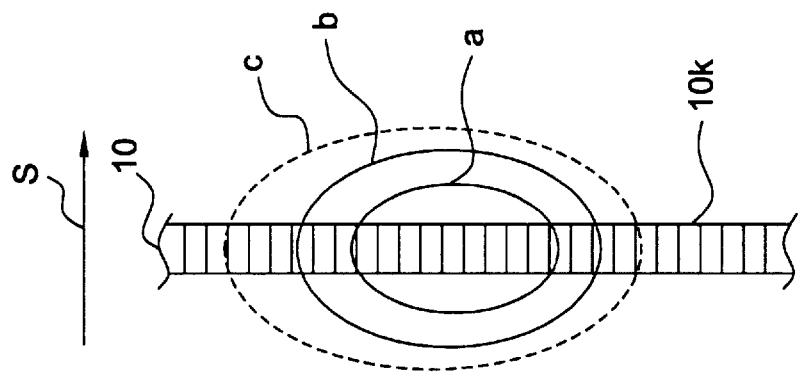
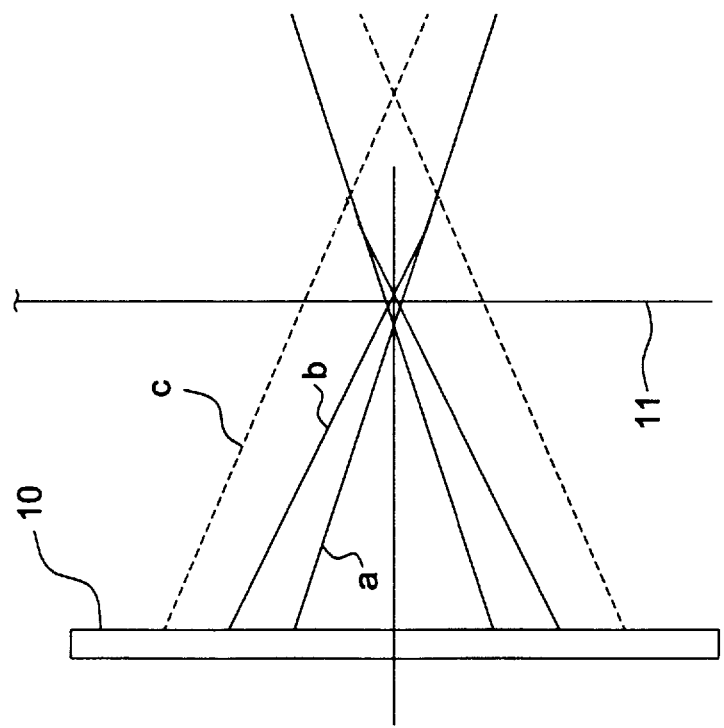

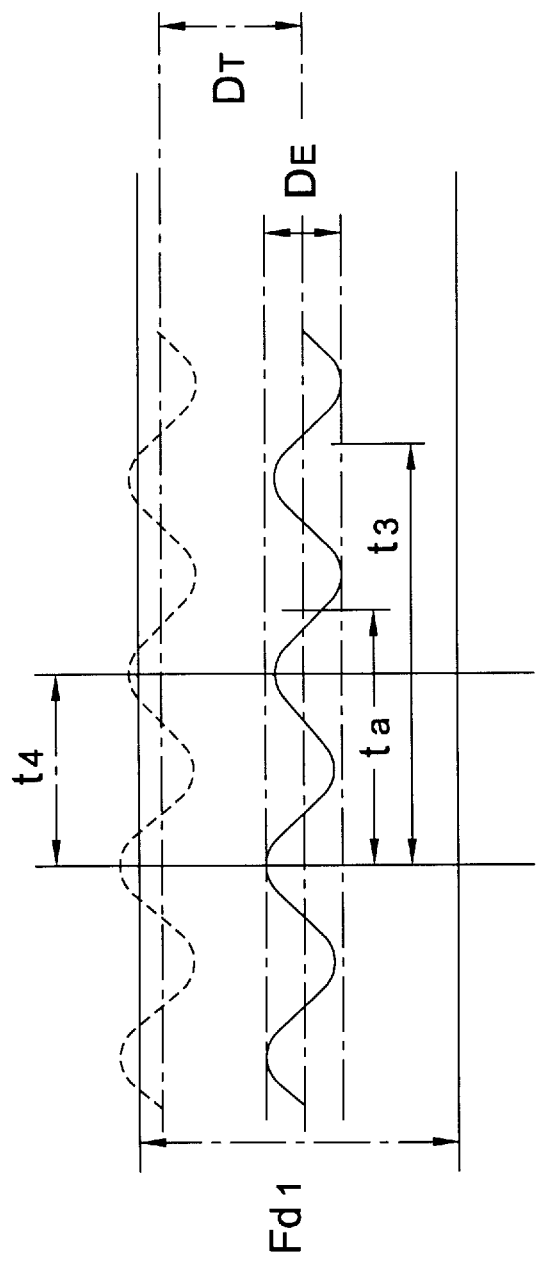
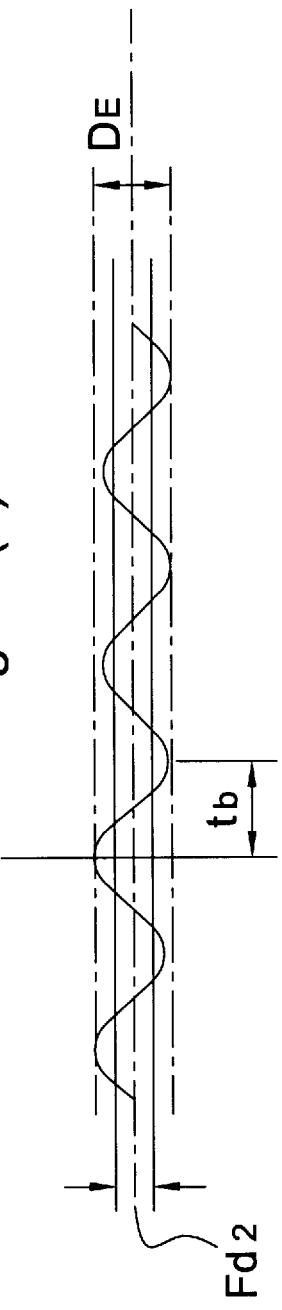

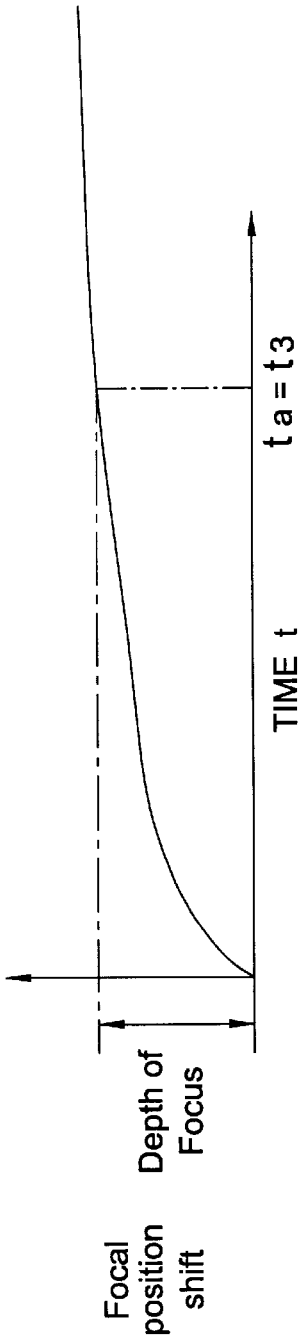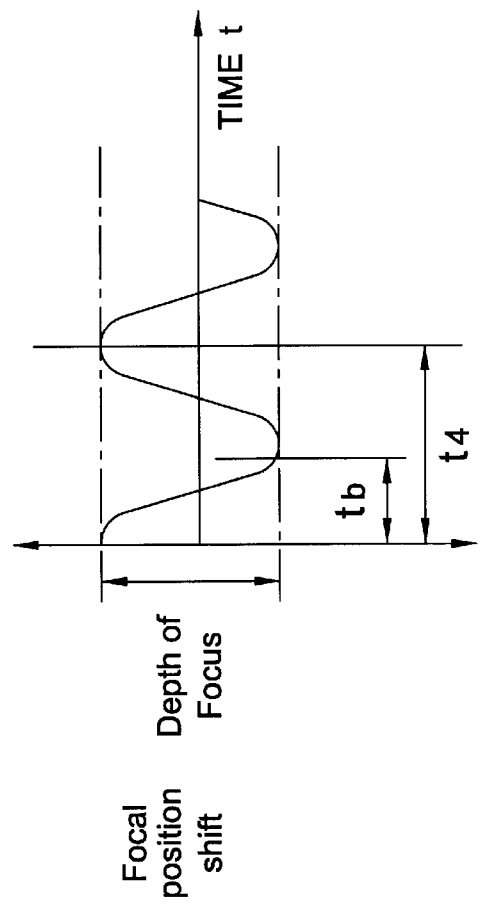

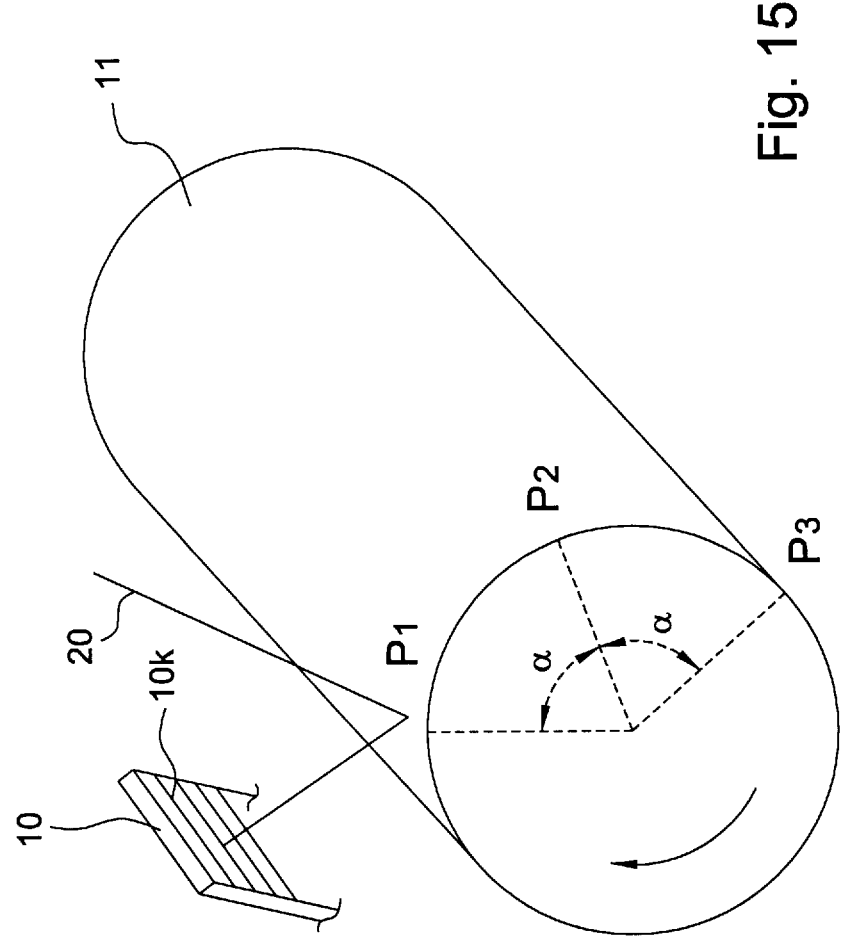

LIGHT BEAM FOCAL POSITION DETECTING DEVICE, LIGHT BEAM PROJECTING DEVICE, AND LIGHT BEAM RECORDING APPARATUS

BACKGROUND OF THE INVENTION

1. Field of the Invention

The present invention relates to a light beam focal position detecting device, light beam projecting device and light beam recording apparatus, and particularly to a light beam focal position detecting device, light beam projecting device and light beam recording apparatus capable of detecting the shift in any direction of the light beam focal position attributable to the temperature variation, external signal, eccentricity of a photosensitive drum, or the like without the need of speeding up the response of detection.

2. Description of the Related Art

In recent years, it has been constantly required to improve the quality of images produced by light beam recording apparatus such as laser beam printers and digital copy machines, and attempts of high-resolution image recording have been repeated. For this purpose, it is necessary to control the light beam focal position accurately so as to maintain the pixel diameter below a prescribed value.

A conventional light beam recording apparatus equipped with a light beam focal position detecting device is disclosed in Japanese Patent Laid-Open No. Hei 2-140710 (1990). This light beam focal position detecting device, which is disposed over the non-image-forming region of the photosensitive drum, is made up of a photosensor and a plate which has slits aligning regularly in the main scanning direction of the light beam and is located at the opening of the photosensor housing.

When the light beam conducted through a collimator lens scans the photosensitive drum, it is detected by the photosensor through the individual slits of the plate. When the light beam has the prescribed diameter, the photosensor produces pulses equal in number to the number of slits. Otherwise, if the beam diameter is greater than the prescribed value, the photosensor produces a signal having a continuous waveform instead of a complete pulse signal. The shift of focal position of the light beam is detected based on the output of the photosensor, and the collimator lens is moved along the optical axis so that the focal position error is corrected.

This Japanese Patent Laid-Open No. Hei 2-140710 also describes, as a variant of the above-mentioned device, a light beam focal position detecting device in which the photosensor detects the light beam through a slit formed in a plate. The device moves the collimator lens along the optical axis in response to the photosensor output level which depends on the beam diameter, thereby correcting the focal position error.

Another conventional light beam recording apparatus equipped with a light beam focal position detecting device is disclosed in Japanese Patent Laid-Open No. Sho 60-100113 (1985). This light beam focal position detecting device includes a mirror placed over the drum surface and a quadrant-split photosensor which receives the reflected light beam from the mirror through a cylindrical lens. A light beam with a correct focal position produces a circular light spot at the center of the quadrant-split photosensor, which then delivers four output signals of an equal level. If the light beam focal position shifts, the light beam produces an ellipsoidal light spot on the photosensor, which then delivers output signals of different levels. The focal position error and shift direction are calculated from the photosensor outputs, and the collimator lens is moved along the optical axis so that the focal position error is corrected.

Still another conventional light beam recording apparatus equipped with a light beam focal position detecting device is disclosed in Japanese Patent Laid-Open No. Hei 2-289812 (1990). This light beam focal position detecting device has the formation of an auto-focus pattern that is a regular alignment of concave and non-concave sections in the non-image-forming region of the photosensitive drum, and reflected light beams from these sections are detected with a photosensor through a convergence lens. The focal position error is detected based on the reduction in the difference of reflected light levels from the concave and non-concave sections, and the collimator lens is moved along the optical axis so that the focal position error is corrected.

Among these prior art light beam focal position detecting devices, the device described in Japanese Patent Laid-Open No. Hei 2-140710 has a response speed of the order of 10 ns at most for a beam diameter of 20 $\mu$m or less and a light beam scanning velocity of the order of 1 $\mu$m/ns in the main scanning direction, and therefore it cannot measure the beam diameter with accuracy on the order of a $\mu$m. The device, which merely calculates the value of focal position error, necessitates a separate means of detecting the shift direction, and involves a complex processing for the correction of focal position.

The device described in Japanese Patent Laid-Open No. Sho 60-100113 cannot form a reflected beam spot at the center of the quadrant-split photosensor if a deviating beam axis for a focal position error is caused by the eccentricity of the photosensitive drum. The reflected light spot may even come out of the quadrant-split photosensor, making the focal position detection totally impossible.

The device described in Japanese Patent Laid-Open No. Hei 2-289812 necessitates an additional fabricating step for forming the auto-focus pattern on the photosensitive drum, resulting in an increased manufacturing cost, and it cannot detect a focal position error caused by the eccentricity of photosensitive drum by the same reason as mentioned above.

SUMMARY OF THE INVENTION

Accordingly, an object of the present invention is to provide a light beam focal position detecting device, light beam projecting device and light beam recording apparatus capable of detecting a light beam focal position error and shift direction accurately without the need of raising the response speed of the photosensor and without incurring a complex device structure.

Another object of the present invention is to provide a light beam focal position detecting device, light beam projecting device and light beam recording apparatus capable of detecting a light beam focal position error caused by the eccentricity of a photosensitive drum and the like as well as a focal position error attributable to the temperature variation or external signal.

Still another object of this invention is to provide a light beam focal position detecting device, light beam projecting device and light beam recording apparatus capable of detecting a light beam focal position error without the need of forming an auto-focus pattern or the like on the photosensitive drum.

In order to achieve the above objectives, the invention in a first form resides in a light beam focal position detecting device for detecting the focal position of a light beam which is emitted by a light source and focused by a focusing optical system. The device comprises a light beam detection means which is disposed on the light path of the light beam and at a position where the light beam from the focusing optical system toward the focal position converges, or at a position where the light beam from the focal position diverges and is adapted to receive the light beam and produce a signal which depends on the beam diameter; and a focal position detecting means which receives the beam diameter signal, compares it with a prescribed value, and produces a focal position signal indicative of the positional relation of the focal position of the light beam with a prescribed focal position.

In order to achieve the above objectives, the invention in a second form resides in a light beam projecting device comprising a light source which emits a light beam; a focusing optical system which focuses the light beam at a prescribed focal position; a light beam detection means which is disposed on the light path of the light beam and at a position where the light beam from the focusing optical system toward the prescribed focal position, or the vicinity thereof, converges or at a position where the light beam from the prescribed focal position, or the vicinity thereof, diverges and is adapted to receive the light beam and produce a signal which depends on the beam diameter; a focal position detecting means which receives the beam diameter signal, compares it with a prescribed value thereby to detect the focal position of the light beam, and produces, based on the detection result, a focal position signal indicative of the positional relation of the focal position of the light beam with the prescribed focal position; and a focal position adjusting means which adjusts the focal position of the focusing optical system based on the focal position signal so that the focal position of the light beam coincides with the prescribed focal position.

In order to achieve the above objectives, the invention in a third form resides in a light beam recording apparatus comprising a light source which emits a light beam; an optical system which focuses the light beam at a prescribed focal position and causes the light beam to scan across a prescribed main scanning range; a recording medium which is located in the prescribed main scanning range and has its region to be exposed to the light beam located at the prescribed focal position; a light beam detection means which is disposed on the light path of the light beam and at a position where the light beam from the optical system toward the prescribed focal position, or the vicinity thereof, converges or at a position where the light beam from the prescribed focal position, or the vicinity thereof, diverges and is adapted to receive the light beam and produce a signal which depends on the beam diameter; a focal position detecting means which receives the beam diameter signal, compares it with a prescribed value thereby to detect the focal position of the light beam and produces, based on the detection result, a focal position signal indicative of the positional relation of the focal position of the light beam with the prescribed focal position; and a focal position adjusting means which adjusts the focal position of the optical system based on the focal position signal so that the focal position of the light beam coincides with the prescribed focal position.

In order to achieve the above objectives, the invention in a fourth form resides in a light beam recording apparatus comprising a light source which emits a light beam; an optical system which focuses the light beam at a prescribed focal position and causes the light beam to scan across a prescribed main scanning range; a recording medium which is located in the prescribed main scanning range and has its region to be exposed to the light beam located at the prescribed focal position; a multi-split light beam detection means which is disposed on the light path of the light beam which is reflected by the recording medium and at a position where the light beam from the optical system diverges after it has converged at the focal position, made up of a prescribed number of light beam sensing elements arrayed in the subordinate scanning direction which is perpendicular to the main scanning direction of the light beam and adapted to receive the light beam and produce a signal which depends on the beam diameter of the light beam; a focal position detecting means which receives the beam diameter signal, compares it with a prescribed value thereby to detect the focal position of the light beam and produces, based on the detection result, a focal position signal indicative of the positional relation of the focal position of the light beam with the prescribed focal position; and a focal position adjusting means which adjusts the focal position of the optical system based on the focal position signal so that the focal position of the light beam coincides with the prescribed focal position.

BRIEF DESCRIPTION OF THE DRAWINGS

FIG. 4A is a diagram explaining the positional relation between the light beam focal position error and the position on the photosensor;

FIGS. 8A and 8B are diagrams explaining the relation between the multi-split photosensor of the third embodiment and incident light beams having different beam diameters;

FIGS. 13A and 13B are diagrams explaining the amount of focal position error with respect to the allowable error;

FIGS. 14A and 14B are diagrams explaining the focal position error on the time axis;

FIG. 15 is a diagram showing the spatial relation between the multi-split photosensor which detects the reflected light beam and the point of detection on the photosensitive drum surface;

DESCRIPTION OF THE PREFERRED EMBODIMENTS

Figure 1:
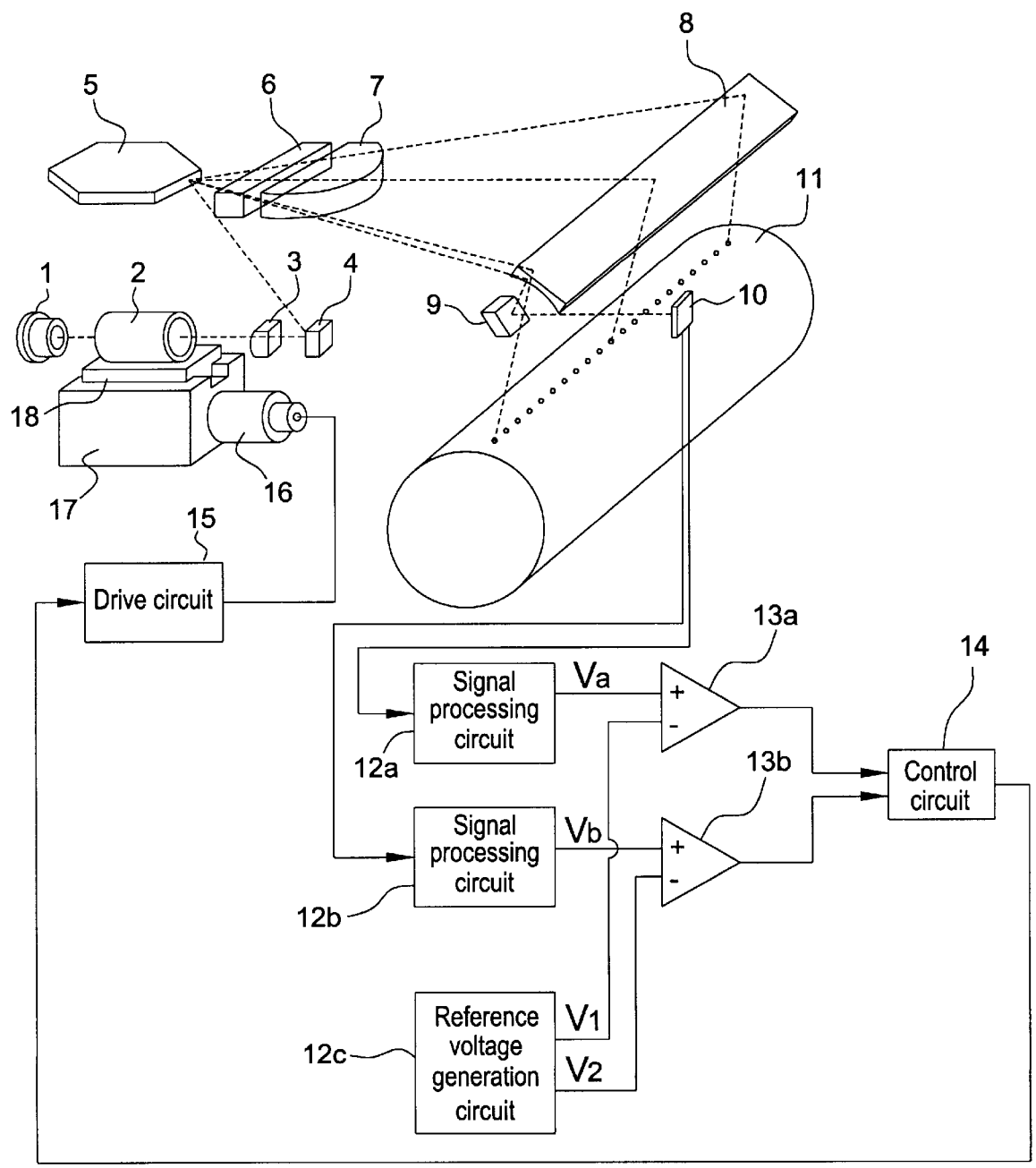
FIG. 1 is an explanatory diagram of the light beam recording apparatus based on a first embodiment of this invention.

FIG. 1 shows the light beam recording apparatus of the first embodiment of this invention, which includes a semiconductor laser 1 which emits a light beam (laser beam) which has been rendered the intensity modulation by the image signal, a collimator lens 2 which forms the laser beam into a collimated beam, a cylindrical lens 3 which converges the laser beam in the subordinate scanning direction at a prescribed position, a plane mirror 4 which reflects the laser beam which has passed through the cylindrical lens 3, a polygonal mirror 5 having a mirror surface at the above-mentioned prescribed position, of lenses 6 and 7 which modify the laser beam so that it has a constant scanning velocity on a prescribed main scanning line, a cylindrical mirror 8 which reflects the laser beam onto the prescribed main scanning line and corrects in unison with the cylindrical lens 3 the tilting of the mirror surface of the polygonal mirror 5, a plane mirror 9 which picks up a laser beam that does not contribute to the image formation, a photosensor 10 which receives the laser beam picked up by the plane mirror 9, a photosensitive drum 11 having its laser beam exposure region positioned to the prescribed main scanning line, signal processing circuits 12a and 12b which process the output signals of the photosensor 10 to produce beam diameter signals, a reference voltage generation circuit 12c which produces reference beam diameter signals having a lower-limit value $V_1$ and upper-limit value $V_2$, comparators 13a and 13b which compare the detected beam diameter signals with the reference beam diameter signals $V_1$, and $V_2$, a control circuit 14 which calculates the focal position error and shift direction from the comparison outputs of the comparators 13a and 13b and produces a resulting control signal, a drive circuit 15 which produce a motor drive current from the control signal, a stepping motor 16 which is driven by the drive circuit 15, and a carriage 18 which moves the collimator lens 2 placed on a mount 17 in the beam axial direction by a prescribed step at a time by being driven by the stepping motor 16.

Figure 2:
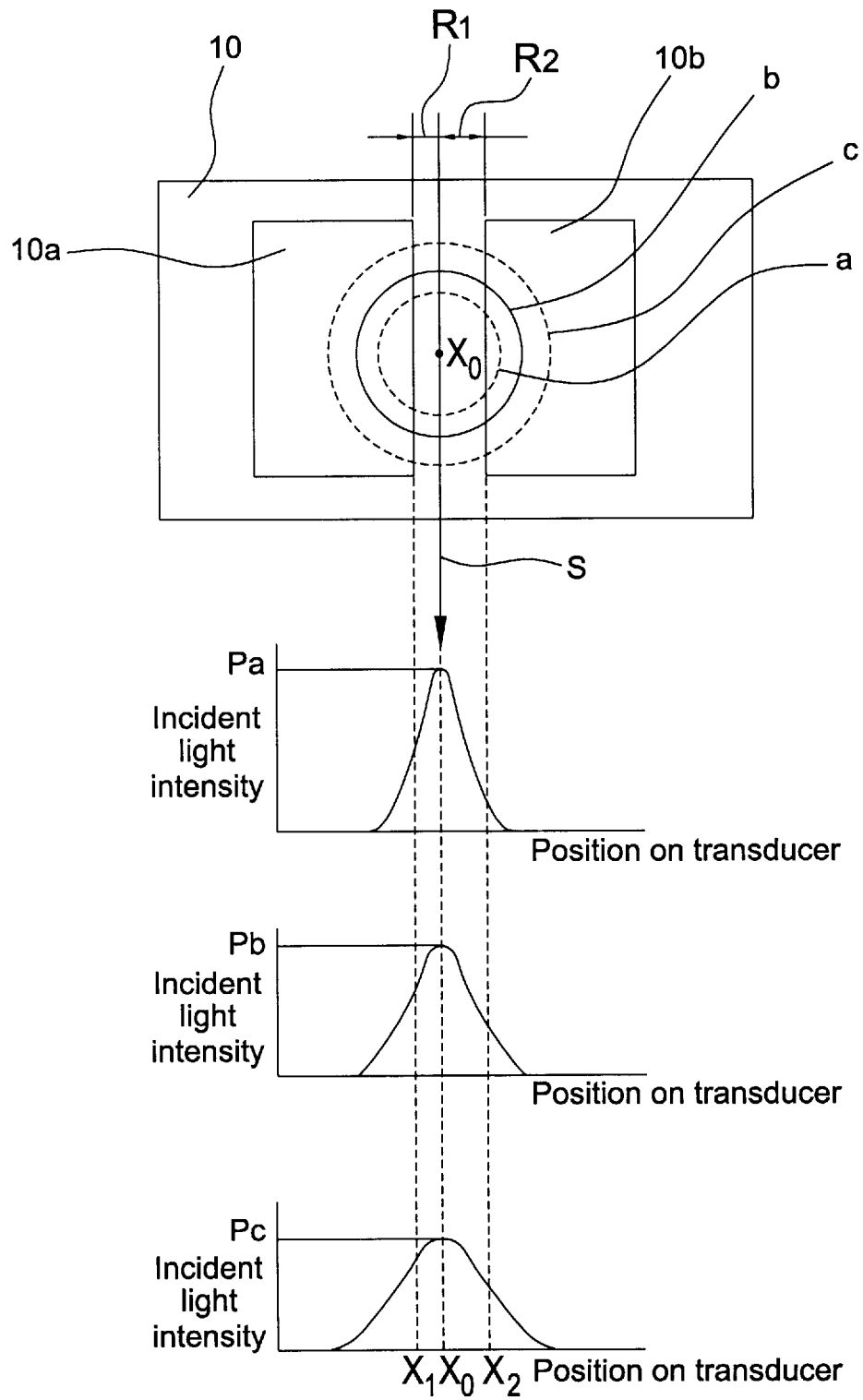
FIG. 2 is a diagram explaining the photosensor of the first embodiment and the intensity distribution of the incident light beam.

FIG. 2 shows the photosensor 10, which includes first and second opto-electric transducers 10a and 10b having their confronting sides located at positions distant by $R_1$ and $R_2(R_2>R_1)$, respectively, from the main scanning line S which passes through the center $X_0$, and sensing the outer sections of the laser beam which passes through the center $X_0$ and has a varying beam diameter as shown by a, b and c. The sides of the first and second transducers 10a and 10b have coordinates $X_1$ and $X_2$ on the x axis. Accordingly, the distances $R_1$ and $R_2$ are equal to $X_0-X_2$ and $X_2-X_o$, respectively.

The first and second opto-electric transducers 10a and 10b have their sides parallel to the main scanning line S dimensioned greater than the expected maximum beam diameter of the laser beam. The photosensor 10 is displaced at such a position that if the laser beam is out of focus, the optical path length from the cylindrical mirror 8 to the plane mirror 9 and to the photosensor 10 is greater than the optical path length from the cylindrical mirror 8 to the photosensitive drum 11 by the amount of focal position error plus a prescribed value.

The laser beam received by the photosensor 10 varies in its beam diameter as shown by a, b and c depending on the focal position. These laser beams having the respective beam diameters will be called simply beam a, beam b and beam c in the following explanation. The beam b has an in-focus beam profile of the case when it is focused correctly on the photosensitive drum 11, the beam a has a far-focus beam profile of the case when it has a focal position farther from the light source than the drum surface, and the beam c has a near-focus beam profile of the case when it has a focal position nearer to the light source than the drum surface.

The opto-electric transducer 10a is sensitive to the partial cross section of the laser beam outside of $X_1$, and the transducer 10b is sensitive to the partial cross section of the laser beam outside of $X_2$, as shown in FIG. 2. When the laser beam focal position shifts, the beam diameter varies and the incident light power on the transducers 10a and 10b varies. If the laser beam is focused farther to become the beam a, the transducers 10a and 10b receive reduced light power as shown by the graph of light intensity Pa, or if the laser beam is focused nearer to become the beam c, the transducers 10a and 10b receive increased light power as shown by the graph of light intensity Pc.

The opto-electric transducer 10a always receives more incident light than does the transducer 10b due to their disposition. Based on this arrangement, an incident light power on the transducer 10a smaller than the light power for the reference lower-limit beam diameter signal $V_1$ from the reference voltage generation circuit 12c indicates the decrease of beam diameter, and an incident light power on the transducer 10b greater than the light power for the reference upper-limit beam diameter signal $V_2$ indicates the increase of beam diameter.

The opto-electric transducers 10a and 10b deliver the electrical signals indicative of the individual light power to the signal processing circuits 12a and 12b, which produce first and second beam diameter signals in response to the signals. The first beam diameter signal for detecting the decrease of beam diameter and the second beam diameter signal for detecting the increase of beam diameter are compared with the reference lower-limit beam diameter signal $V_1$ and upper-limit beam diameter signal $V_2$, respectively.

Figure 3:
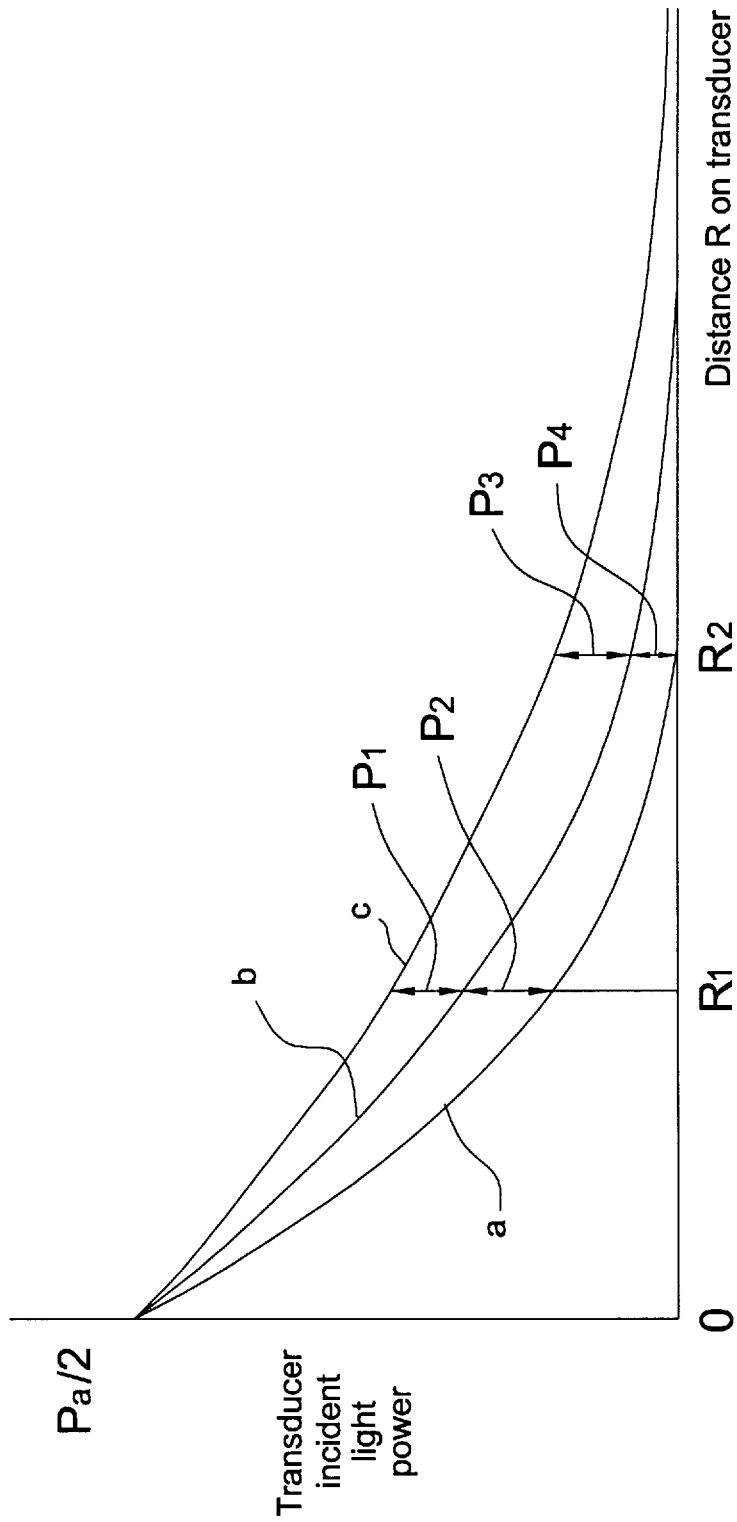
FIG. 3 is a graph showing the relation between the incident light power on the opto-electric transducers of the photosensor and the distance from the center of the photosensor based on the first embodiment.

FIG. 3 shows the incident light power on the opto-electric transducers 10a and 10b at positions with distances $R_1$ and $R_2$ from the main scanning line S. At position $X=X_0$ on the x-axis coordinate of FIG. 2, where R=0, the transducer 10a (or 10b) has its confronting side located at the beam center, and the incident light power is a half the total light power $P_0$ of the laser beam. The incident light power decreases as the transducer moves away from the beam center.

With the transducers 10a and 10b being kept at a certain position, when the beam diameter increases from a to b to c as shown in FIG. 2, the incident light power on the transducers 10a and 10b increases as shown by the corresponding curves a, b and c. The transducer 10a is disposed at the position with the distance $R_1$ from the position of $X_0$, and it has differential light power $P_2$ and $P_1$ for the beams a and c with respect to the beam b in a relation of $P_2>P_1$. Therefore, it can detect accurately the decrease of the beam diameter below the reference lower-limit value of beam diameter. The transducer 10b is disposed at the position with the distance $R_2$ from the position of $X_0$, and it has differential light power $P_4$ and $P_3$ for the beams a and c with respect to the beam b in a relation of $P_3>P_4$. Therefore, it can detect accurately the increase of the beam diameter above the reference upper-limit value of beam diameter.

Figure 4A:
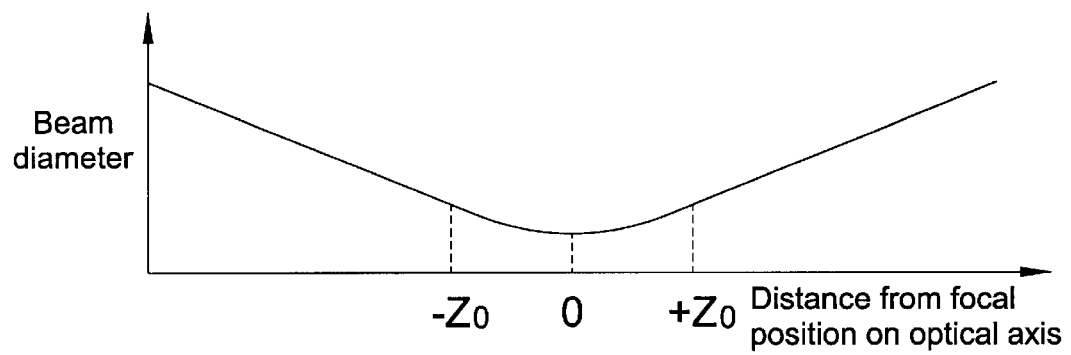
FIG. 4A is a graph showing the relation between the position on the photosensor and the beam diameter.

FIG. 4A shows the laser beam diameter which depends on the distance of the position on the optical axis from the focal position 0. In the first embodiment, the photosensor 10 is placed in the diverging region, e.g., at position $+Z_0$, where the laser beam diverges and never converges even if the focal position shifts, and the focal position error and shift direction can be detected based on the detection of the beam diameter. Alternatively, the photosensor 10 may be placed in the converging region, e.g., at position $-Z_0$, where the laser beam never diverges even if the focal position shifts.

Figure 4B:
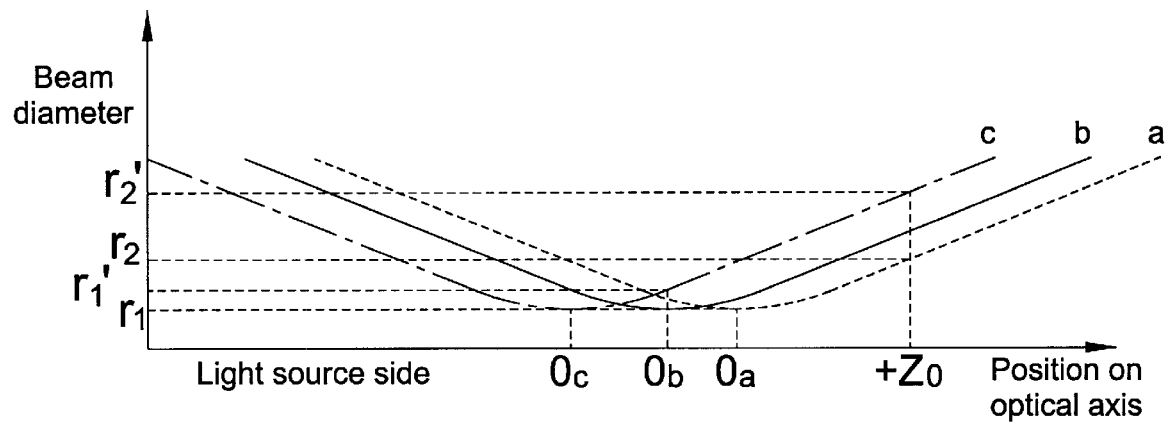
FIG. 4B is a graph showing the relation among the position of the photosensor, the beam diameter and the light beam focal position which varies depending on the beam diameter.
Figure 4C:
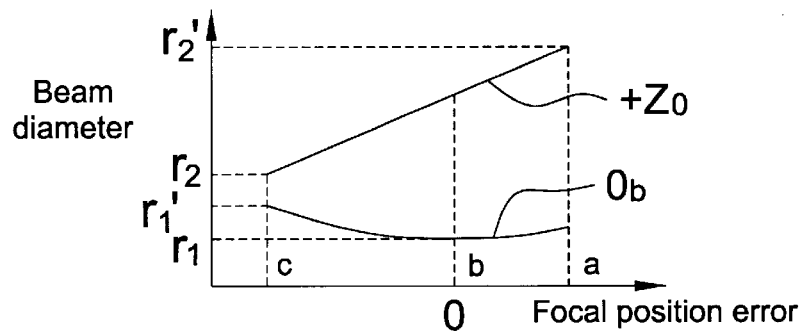
FIG. 4C is a graph showing the relation between the focal position error and the variation of beam diameter.

FIGS. 4B and 4C show the beam diameters of the beams a, b and c having focal positions Oa, Ob and Oc, with the photosensor 10 being placed at the position $+Z_0$. In the case where the photosensor 10 is placed at the focal position Ob of the beam b, i.e., it is equivalent to the position of the drum surface, the focal position error and shift direction cannot be detected accurately due to a minimal beam diameter variation $r_1'-r_1$ and shift of focal position, whereas the disposition of the photosensor 10 based on this embodiment at the position $+Z_0$, where the beam diameter variation $r_2'-r_2$ is large in a linear relation with the shift of focal position, enables the accurate detection of the focal position error and shift direction.

The operation of the first embodiment will be explained. The semiconductor laser 1 emits a laser beam which carries an image signal rendered by intensity modulation by the drive circuit (not shown). The laser beam is collimated by the collimator lens 2 mounted on the carriage 18 having a moving direction along the optical axis, conducted through the cylindrical lens 3, reflected by the plane mirror 4, and projected on to polygonal mirror 5.

The cylindrical lens 3, which has power in the subordinate scanning direction as mentioned previously, converges the collimated laser beam from the collimator lens 2 in the subordinate scanning direction on the mirror surfaces of the polygonal mirror 5. The polygonal mirror 5 is rotated at a constant speed by a motor (not shown). Consequently, the laser beam reflected by the plane mirror 4 is reflected by the turning mirror surface of the polygonal mirror 5 and deflected at a constant angular velocity.

The deflected laser beam is conducted through the f lenses 6 and 7, reflected by the cylindrical mirror 8, and focused on the surface of the photosensitive drum 11. The laser beam is modified against the tilting of the mirror surfaces of the polygonal mirror 5 by the action of the cylindrical lens 3 and cylindrical mirror 8. It is also modified to have a constant scanning speed on the drum surface by the action of the f lenses 6 and 7.

The laser beam deflected by the polygonal mirror 5 to one extreme in the main scanning direction outside the image recording region is reflected by the cylindrical mirror 8 and plane mirror 9, and then incident to the photosensor 10. The opto-electric transducers 10a and 10b of the photosensor 10 produce signals in response to individual light power of the incident laser beam and deliver the output signals to the signal processing circuits 12a and 12b, which process the signals and deliver the resulting beam diameter signals $V_a$ and $V_b$ to the positive input terminals of the comparators 13a and 13b.

For the laser beam having the beam diameter a shown in FIG. 2, the beam diameter signals $V_a$ and $V_b$ relate with the reference lower-limit and upper-limit beam diameter signals $V_1$ and $V_2$ on the negative input terminals of the comparators 13a and 13b supplied by the reference voltage generation circuit 12c, as follows:

$$V_a<V_1, V_b<V_2$$

Figure 5A:
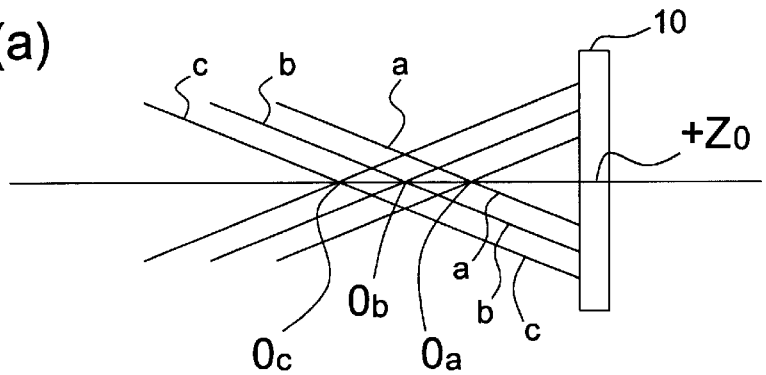
FIGS. 5B and 5C are flowcharts showing the control operation for correcting the focal position error.

In this case, both comparators 13a and 13b produce output signals of "0." In this state, the beam focal position Oa is farther from the light source than is the reference focal position Ob as shown in FIG. 5A (far-focus state). In response to the "0" output signals from the comparators 13a and 13b, the control circuit 14 issues a control signal for correcting the far-focus state to the motor drive circuit 15. The drive circuit 15 drives the stepping motor 16 for a certain number of steps in accordance with the control signal so that the carriage 18 moves the collimator lens 2 toward the semiconductor laser 1 along the optical axis. The control circuit 14 repeats this operation until the comparators 13a and 13b produce outputs "1" and "0." respectively.

For the laser beam having the beam diameter b shown in FIG. 2, the beam diameter signals $V_a$ and $V_b$ relate with the reference signals $V_1$ and $V_2$ as follows.

$$V_a>V_1, V_b<V_2$$

The comparators 13a and 13b produce output signals of "1" and "0," respectively. In this state, the beam b is focused at the focal position Ob (in-focus state), and the control circuit 14 sends no control signal to the drive circuit 15.

For the laser beam having the beam diameter c shown in FIG. 2, the beam diameter signals $V_a$ and $V_b$ relate with the reference signals $V_1$ and $V_2$ as follows.

$$V_a>V_b>V_2$$

Both comparators 13a and 13b produce output signals of "1." In this state, the beam c has the focal position Oc nearer to the light source than is the reference focal position Ob as shown in FIG. 5A (near-focus state). In response to the "1" comparison output signals, the control circuit 14 issues a control signal for correcting the near-focus state to the motor drive circuit 15. The drive circuit 15 drives the stepping motor 16 for a certain number of steps in accordance with the control signal so that the carriage 18 moves the collimator lens 2 away from the semiconductor laser 1 along the optical axis. The control circuit 14 repeats this operation until the comparators 13a and 13b produce outputs "1" and "0," respectively.

The following Table 1 summarizes the output signals of the comparators 13a and 13b for the three beam diameters a, b and c.

[TABLE 1]

| Beam diameter | Comparator 13a | Comparator 13b | Focal state |
| --- | --- | --- | --- |
| a | 0 | 0 | Far-focus |
| b | 1 | 0 | In-focus |
| c | 1 | 1 | Near-focus |

Figure 5B:
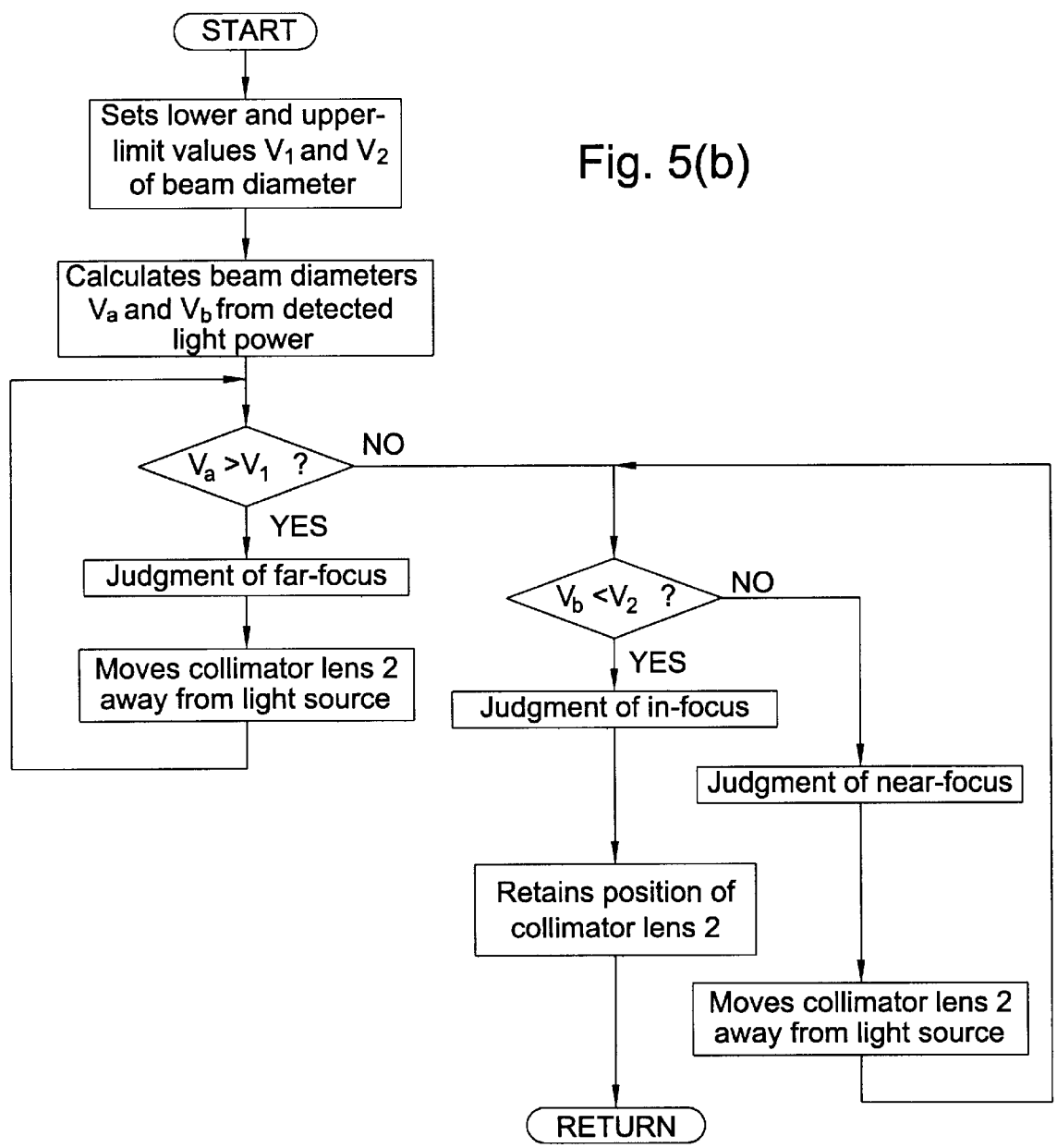
Figure 5C:
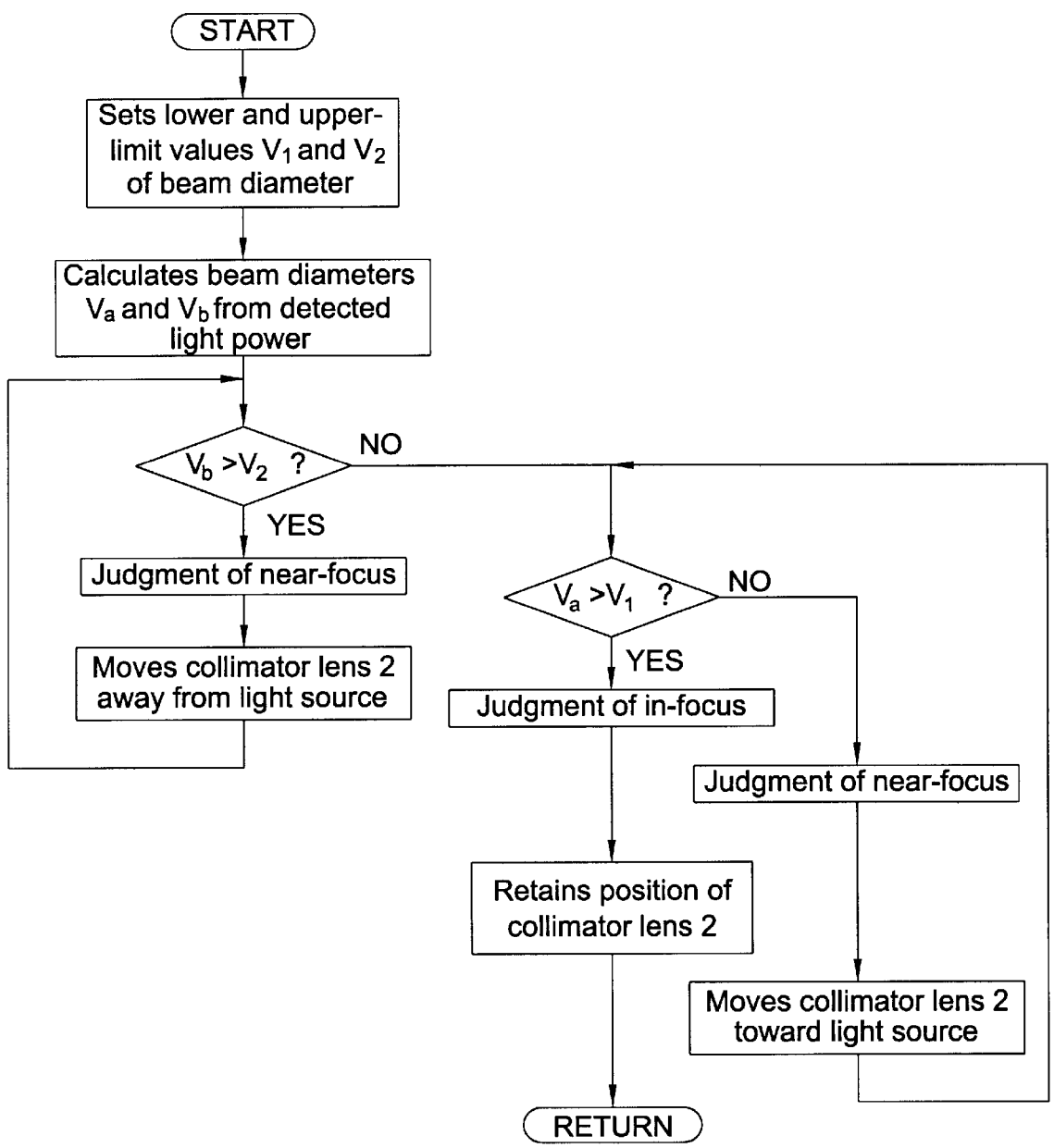

In this manner, the laser beam projected on to the drum surface has its beam diameter controlled within the range between the upper limit and lower limit determined by the reference beam diameter signals $V_1$ and $V_2$. The control operation will be explained on the flowcharts of FIGS. 5B and 5C.

There are positional ranges where the beam diameter is virtually constant on both sides of the focal position 0 as shown in FIG. 4A. If these ranges are wide, the influence of a shift of focal position caused by the temperature variation or the like is small. The focal position is defined to include these ranges in this invention.

In the first embodiment, the position $+Z_0$ of the photosensor 10 is preferably set to a position where the Gaussian beam profile is retained within the range of 1 mm to 100 mm from the focal position. If the $+Z_0$ position is nearer than 1 mm to the focal position, the beam diameter varies too little, or if the $+Z_0$ position is farther than 100 mm from the focal position, the beam differs much from the Gaussian profile and also the light power falls too low to detect the focal position accurately.

Figure 6:
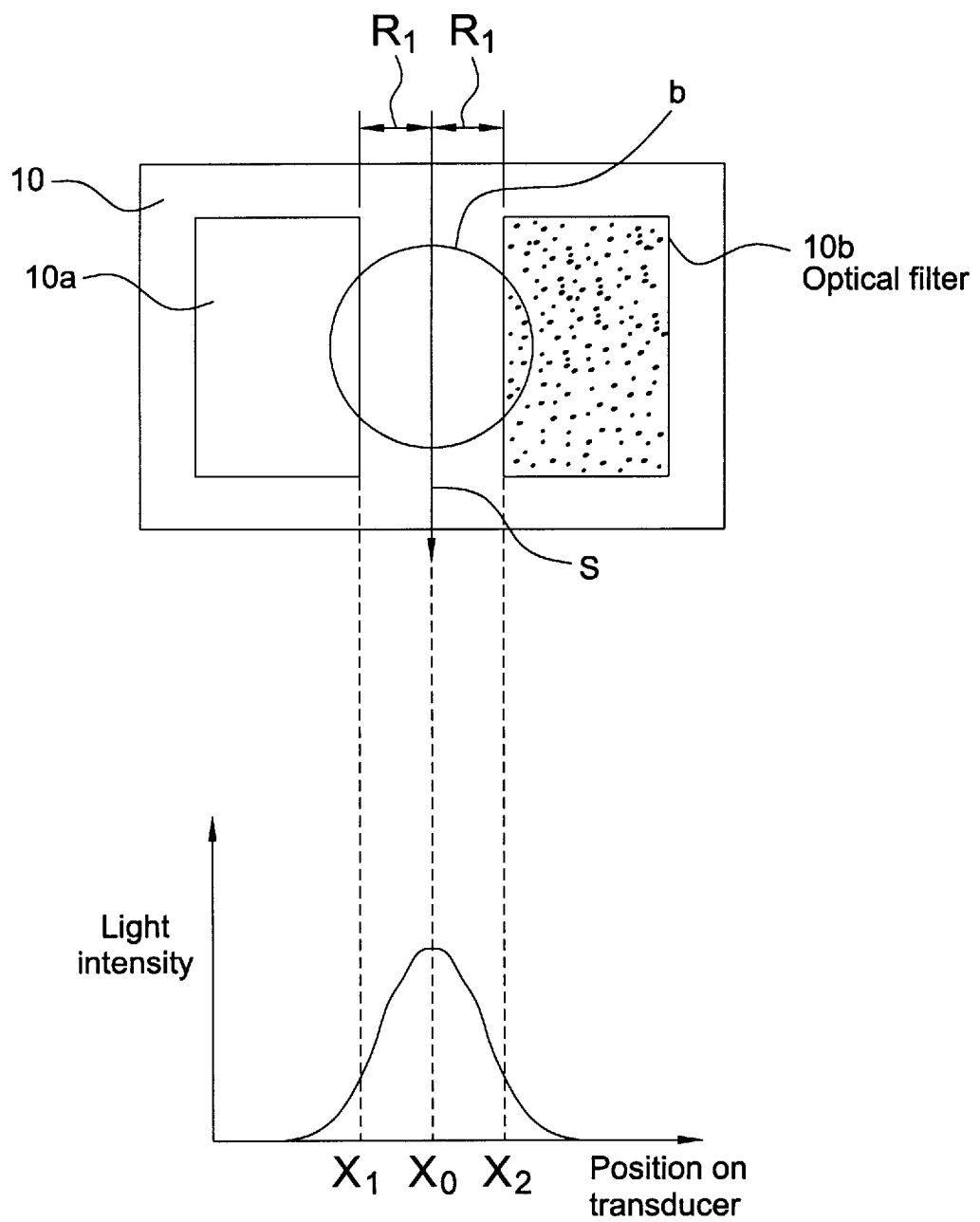
FIG. 6 is a diagram explaining the photosensor used in the light beam recording apparatus of the second embodiment and the intensity distribution of the incident light beam.

FIG. 6 shows the photosensor 10 used in the light beam recording apparatus based on the second embodiment of this invention. The arrangement except for the photosensor 10 is identical to the first embodiment, and the explanation thereof is not repeated.

The photosensor 10 consists of two opto-electric transducers 10a and 10b, and is positioned to have its central position $X_o$ at the center of the beam b and located at the same position on the optical axis as the first embodiment. One transducer 10b is covered with an optical filter, by which the incident light power on the transducer 10b is reduced. Accordingly, the incident light power on another transducer 10a is always greater than that of the transducer 10b.

When the beam diameter decreases, the transducer 10a has an incident light power lower than a certain power, and when the beam diameter increases, the transducer 10b has an incident light power higher than the certain power, as in the case of the first embodiment. Accordingly, the above-mentioned relation between the beam diameter signals $V_a$ and $V_b$ and the reference lower-limit and upper-limit beam diameter signals V, and $V_2$ holds also in this case.

As a variant arrangement of the second embodiment, a reflective film or the like which varies the incident light power of opto-electric transducer may be formed on one transducer instead of using the optical filter.

As another variant arrangement of the second embodiment, opto-electric transducers 10a and 10b having different sensitivities may be used instead of manipulating the incident light power on one transducer, and the same effectiveness as the preceding embodiment is attained.

As still another variant arrangement of the second embodiment, the reference lower-limit and upper-limit beam diameter signals $V_1$ and $V_2$ may be set appropriately so that opto-electric transducers 10a and 10b having the same sensitivity are used without manipulating the incident light power to one transducer, in which case $V_a=V_b$, and the same effectiveness as the preceding embodiment is attained. Specifically, in response to the outputs of the transducers 10a and 10b, the signal processing circuits 12a and 12b produce output voltages $V_a$ and $V_b$ in a relation of $V_1<V_a=V_b<V_2$ when the beam diameter is within the allowable range, or in a relation of $V_a=V_b<V_1<V_2$ when the beam diameter is below the allowable range, or in a relation of $V_1<V_2<V_a=V_b$ when the beam diameter is above the allowable range. The comparison outputs of the comparators 13a and 13b are processed by the control circuit 14 in the same manner as the first embodiment.

As still another variant arrangement of the second embodiment, the photosensor may be placed at the position where it is exposed directly to the laser beam from the lenses, or the position where it is exposed directly to the laser beam from the cylindrical mirror, or the position where it is exposed to the reflected laser beam from the photosensitive drum. The optical system may include additional component parts such as lenses and mirrors in order to enhance the sensitivity of detection of the beam diameter or facilitate the detection. The photosensor 10 may be formed of a single opto-electric transducer which produces a beam diameter signal.

Figure 7:
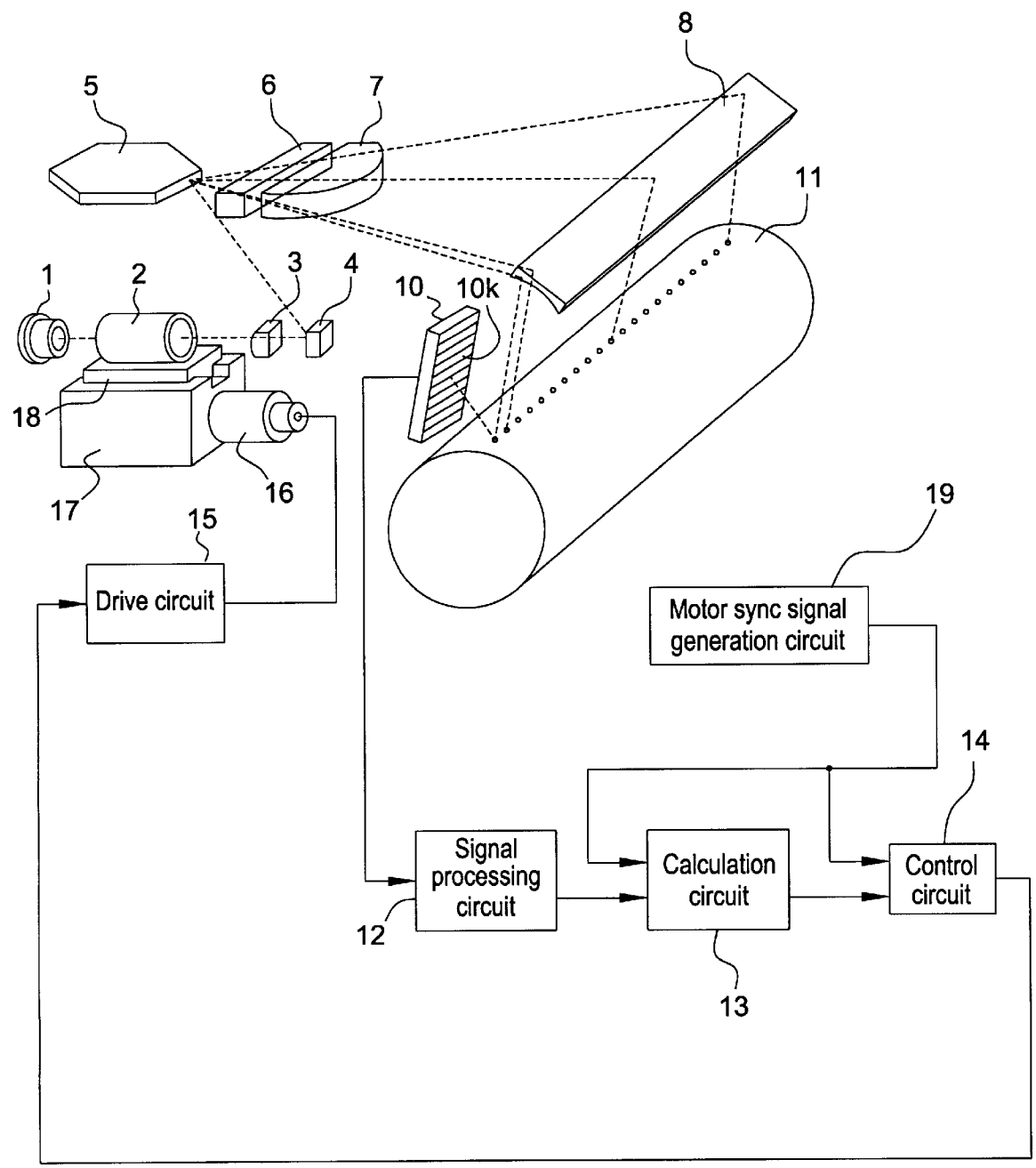
FIG. 7 an explanatory diagram of the light beam recording apparatus based on a third embodiment of this invention.

FIG. 7 shows the light beam recording apparatus based on the third embodiment of this invention, in which component parts identical to those of FIG. 1 are referred to by the same symbols and explanation thereof is omitted. The apparatus includes a multi-split photosensor 10 made up of opto-electric transducers 10k arrayed in the subordinate scanning direction, a calculation circuit 13 which calculates the focal position error and shift direction of the laser beam, and a motor sync signal generation circuit 19 which produces a signal synchronous to the rotation of the motor.

FIGS. 8A and 8B show the reception by the multi-split photosensor 10 of the reflected laser beam having beam diameter a, b or c from the photosensitive drum 11. The operation of the apparatus will be explained.

When the beam diameter of the laser beam has varied due to temperature variation or the like, the reflected beam from the photosensitive drum 11 is incident to the multi-split photosensor 10. The multi-split photosensor 10 produces signals depending on the number of transducers that have received the light. The signal processing circuit 12 produces a beam diameter signal from the photosensor output signals. The calculation circuit 13 compares the beam diameter signal with the reference beam diameter signal to discriminate the states of far-focus, in-focus and near-focus. The control circuit 14 produces a control signal for correcting the beam diameter from the output of the calculation circuit 13 and the motor sync signal provided by the motor sync signal generation circuit 19, and delivers the signal to the motor drive circuit 15. The motor drive circuit 15 produces a drive current from the control signal and supplies the current to the stepping motor 16, which moves the collimator lens 2 along the optical axis, and the beam diameter error is corrected.

The manner of beam diameter detection will be explained in connection with FIGS. 8A and 8B.

(1) When the focal position is exactly on the drum surface, the beam b is sensed by one opto-electric transducer 1 Ok of the multi-split photosensor 10.

(2) When the focal position shifts to become farther from the light source than is the drum surface, the beam c is sensed by transducers 10k of m in number.

(3) When the focal position shifts to become nearer to the light source than is the drum surface, the beam a is sensed by transducers 10k of k in number.

Based on the number of opto-electric transducers 10k that have sensed the laser beam, the collimator lens 2 is moved along the optical axis so that the shift of focal position is corrected as in the first embodiment.

Next, the detection of focal position shift caused by the displacement of the drum surface will be explained.

Figure 9A:
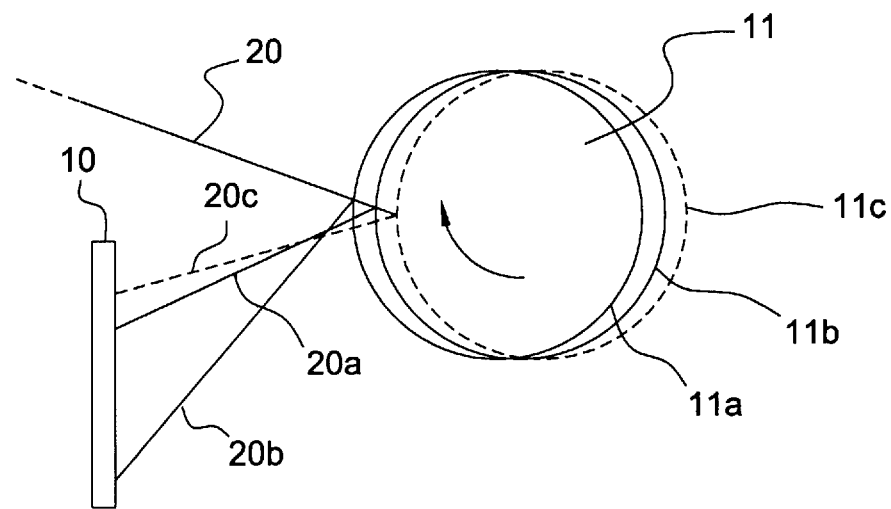
FIGS. 9A and 9B are diagrams explaining the relation between the multi-split photosensor and the light beam reflected on the surface of an eccentric photosensitive drum.
Figure 9B:
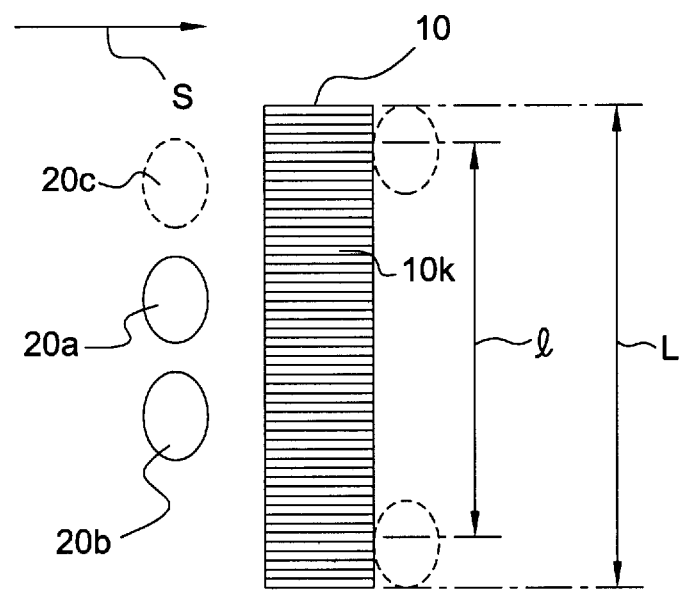

FIGS. 9A and 9B show the projected laser beam 20 and reflected beams 20a, 20b and 20c which are shifted in the range between 20b and 20c in the subordinate scanning direction due to the displacement of the surface of photosensitive drum 11 shown by 11a, 11b and 11c. The multi-split photosensor 10 which is made up of multiple rectangular opto-electric transducers 10k arrayed in the subordinate scanning direction can detect the beam diameter in any case.

Figure 10:
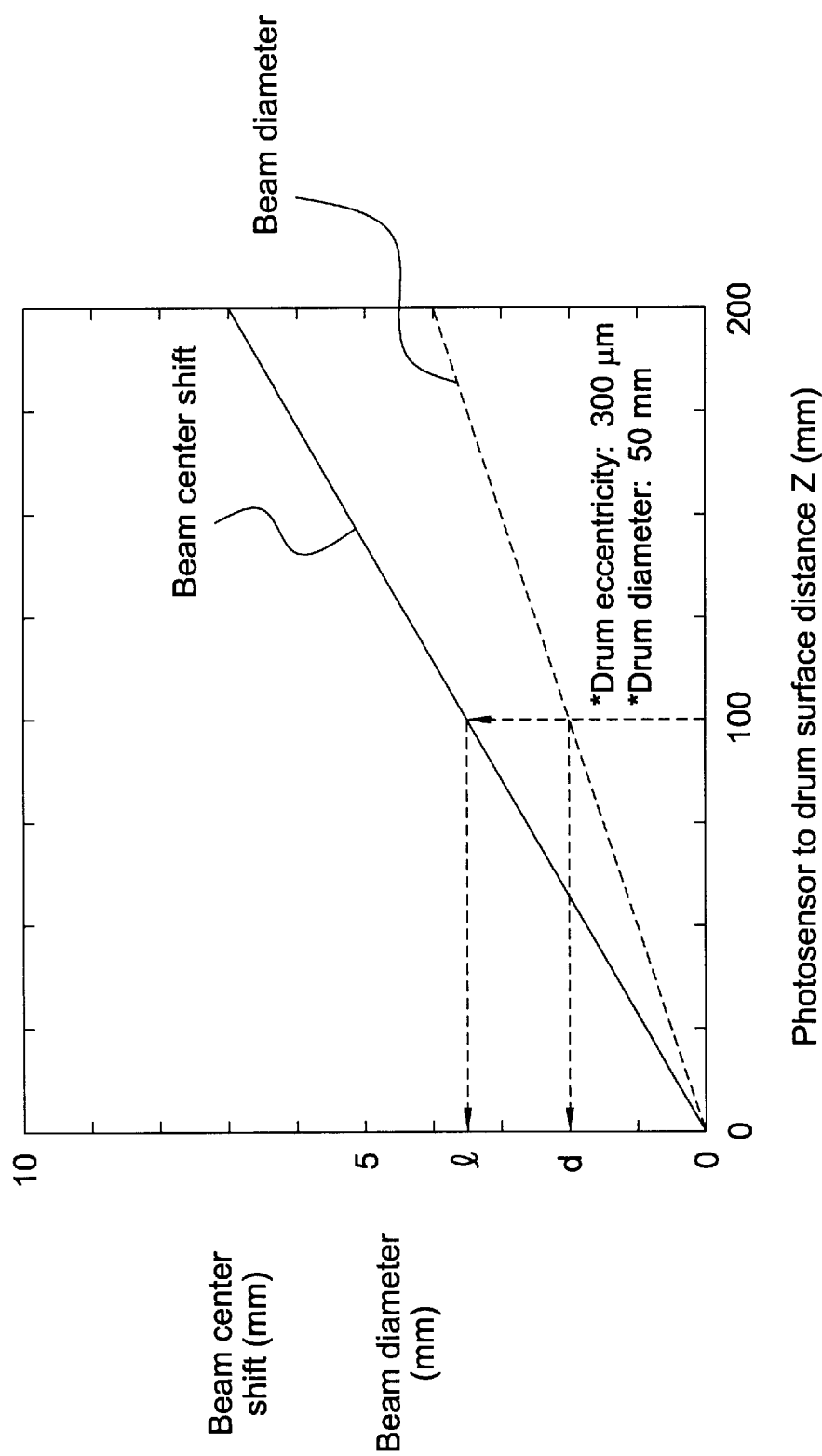
FIG. 10 is a graph showing the relation among the distance of the multi-split photosensor from the photosensitive drum surface, the amount of shift of the light beam center, and the beam diameter.

FIG. 10 shows by graph the relation among the distance Z (mm) from the multi-split photosensor 10 to the photosensitive drum 11, the amount of shift of the beam center position and the beam diameter on the drum having an eccentricity of 300 μm. A practical distance between the photosensor and drum surface is from 50 mm to 200 mm, from the viewpoint of the beam diameter to be detected and the disposition of the photosensor 10.

With the photosensor-to-drum distance being set 100 mm or less, the necessary dimension L of the photosensor 10 in the subordinate scanning direction shown in FIG. 9B is evaluated to be 6 mm, i.e., a beam center shift of 4 mm or less plus a beam diameter of 2 mm or less, from the scale reading at "l" and "d" on the graph of FIG. 10.

Figure 11A:
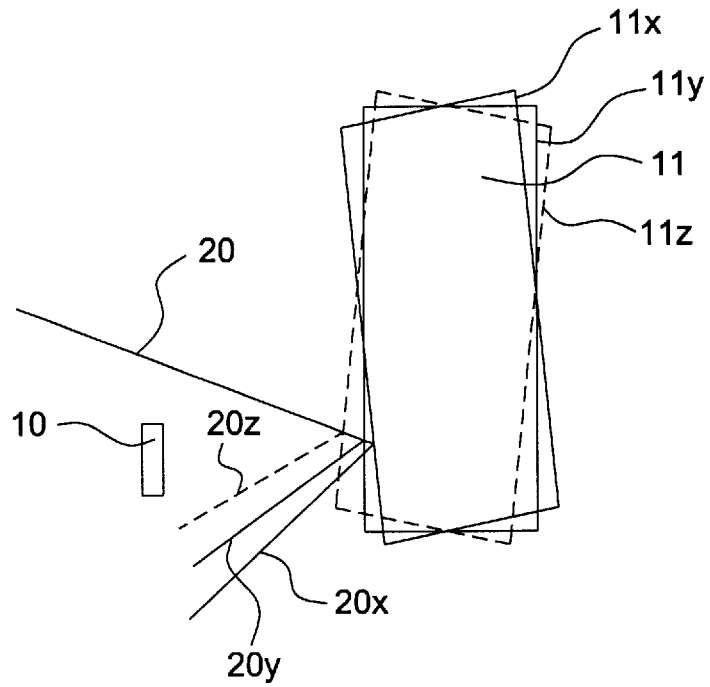
FIGS. 11A and 11B are diagrams explaining the relation between the multi-split photosensor and the light beam reflected on the displaced photosensitive drum surface.
Figure 11B:
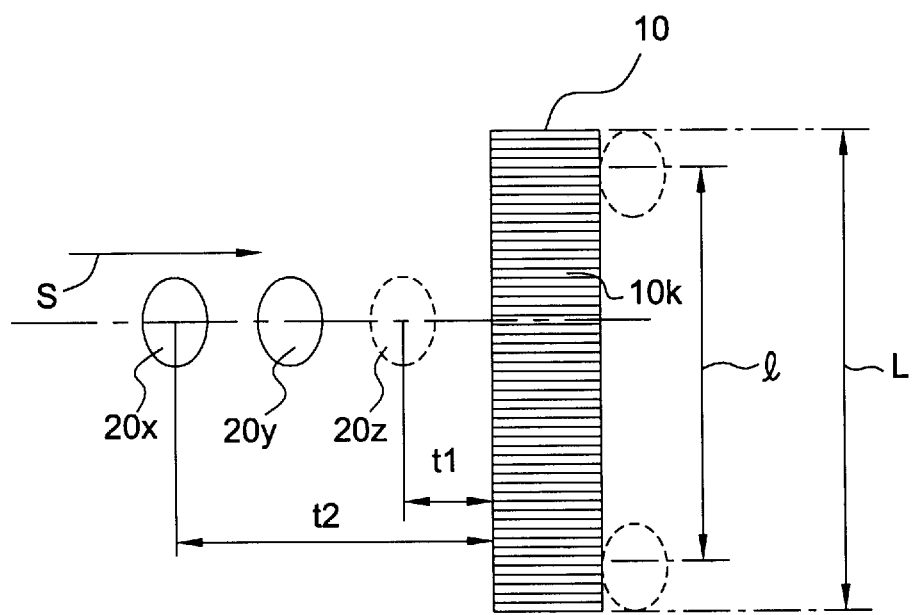

FIG. 11A and 11B show the projected laser beam 20 and reflected beams 20x, 20y and 20z which are shifted in the range between 20x and 20z in the main scanning direction due to the displacement of the surface of photosensitive drum 11 shown by 11x, 11y and 11z. Although a shift of the reflected beam in the main scanning direction causes the time of beam incident to the photosensor 10 to vary, the beam center position does not vary in the subordinate scanning direction. Accordingly, the reflected beam is always incident to the multi-split photosensor 10 even if it is shifted in the main scanning direction, and the beam diameter can be detected.

Figure 12:
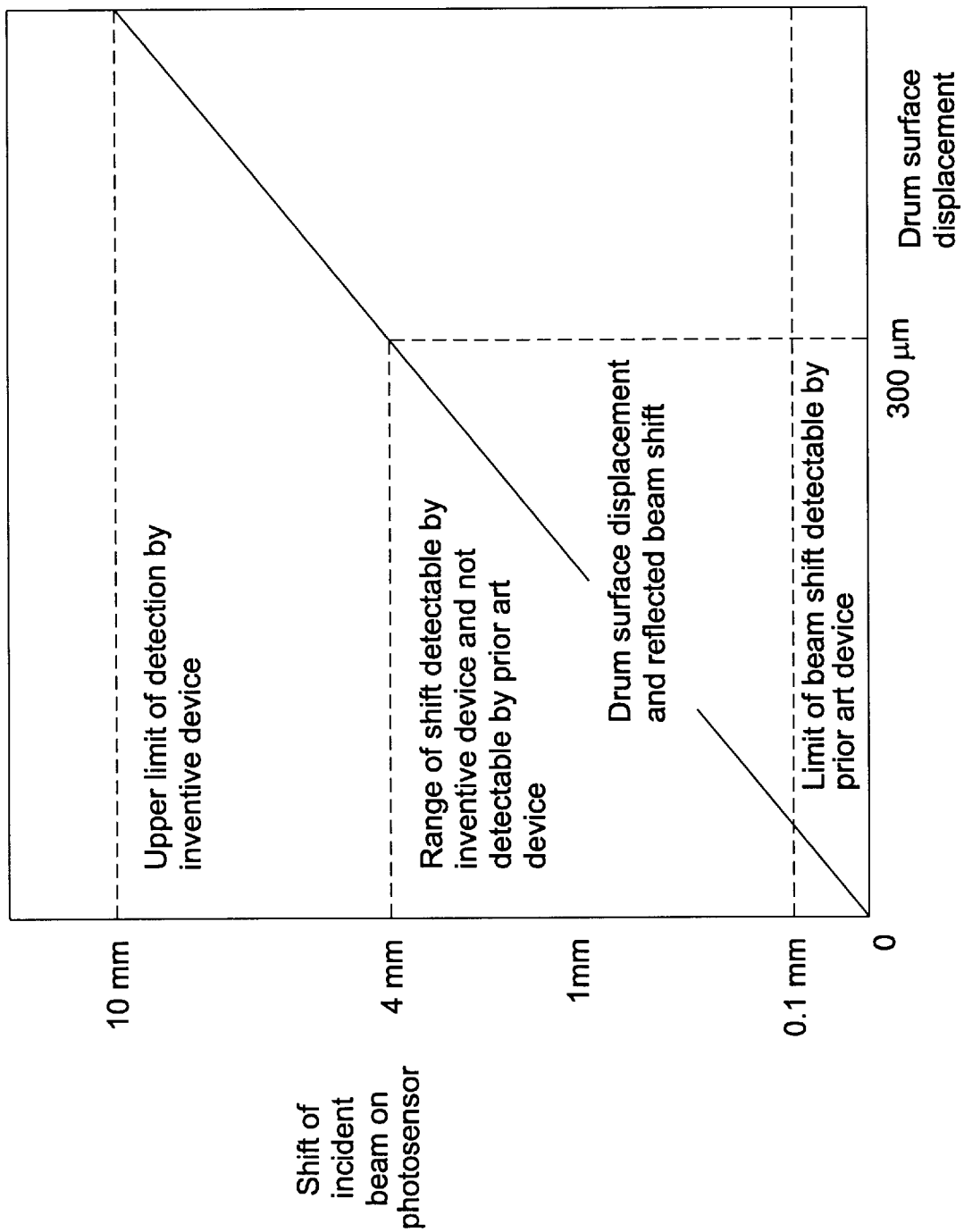
FIG. 12 is a graph showing the relation between the amount of displacement of the photosensitive drum surface and the focal position error of the incident light beam on the multi-split photosensor.

FIG. 12 shows by graph the relation between the amount of displacement of the drum surface and the amount of shift of the reflected beam resulting from the conventional apparatus and inventive apparatus. For a typical drum surface displacement of 300 μm or less, the incident beam to the photosensor has a shift of 4 mm or less. The conventional apparatus allows a beam shift of 0.1 mm at most, and therefore it cannot detect the beam having a large shift. Whereas, the inventive apparatus which employs the multi-split photosensor 10 made up of multiple rectangular opto-electric transducers 1 0k arrayed to cover the 6 mm range in the subordinate scanning direction can easily detect the beam having a large shift.

Consequently, a shift of light beam focal position caused by environmental factors such as temperature variation or caused by the displacement of the photosensitive drum 11 can readily be detected with a single multi-split photosensor 10 made up of multiple rectangular opto-electric transducers 10k, and it is possible to maintain the beam diameter within a certain range on the drum surface for the accomplishment of high-quality image recording.

Next, the time interval of the detection of the reflected beam from the drum surface will be explained. FIG. 13A shows the allowable focal position error (focal depth) $Fd_1$, the focal position error $D_E$ caused by the eccentricity of the photosensitive drum 11 and the focal position error $D_T$ attributable to the thermal factor of the case where the light beam 20 has a beam diameter of 50 μm or more (equivalent to a pixel density of 600 dpi or less). Since $D_E$ is incomparably smaller than $Fd_1$, it is sufficient to correct only the heat-causing focal position error $D_T$. Indicated by ta is the time interval of the detection of the reflected beam, $t_3$ is the time at which the heat-causing focal position error reaches the depth of focus, and $t_4$ is the rotational period of the photosensitive drum 11.

FIG. 14A shows the heat-causing focal position error on the time axis, showing clearly the time when the heat-causing focal position error reaches the depth of focus.

In this embodiment, the detection time ta is set to be shorter than or equal to the time length $t_3$ in which the heat-causing focal position error reaches the depth of focus. In consequence, it is possible for the light beam recording apparatus having a beam diameter of 50 μm or less to prevent the deterioration of image quantity in the event of the occurrence of focal position error of the light beam 20.

FIG. 13B shows the allowable focal position error (depth of focus) $Fd_2$, and the focal position error $D_E$ caused by the eccentricity of the photosensitive drum 11 of the case where the light beam 20 has a beam diameter of 50 μm or more (equivalent to a pixel density of 600 dpi or less). The figure reveals that a smaller beam diameter causes the depth of focus to decrease, and thus the allowable focal position error to decrease, and therefore the focal position error $D_E$ caused by the drum eccentricity cannot be neglected.

FIG. 14B shows that the time length in which the eccentricity-causing focal position error reaches the depth of focus is virtually equal to the rotational period $t_4$ of the photosensitive drum 11 and the error has maximum and minimum values in synchronism with the rotation of the photosensitive drum 11.

By the reason mentioned above, in this embodiment, the time interval tb of the detection of reflected beam is set to be smaller than or equal to a half of the rotational period $t_4$ of the photosensitive dram 11. As a consequence, it is possible for the light beam recording apparatus having a beam diameter of 50 μm or less to prevent the deterioration of image quantity in the event of the occurrence of focal position error of the light beam 20.

FIG. 15 shows the rotating photosensitive dram 11. Rotational angles of the dram corresponding to the above-mentioned detection time lengths ta and tb are calculated by the control circuit 14 based on the motor sync signal provided by the motor sync signal generation circuit 19. The control circuit 14 controls the multi-split photosensor 10 and signal processing circuit 12 through the control bus (not shown) in accordance with the calculation result so that the photosensor 10 produces output signals and the signal processing circuit 12 produces beam diameter signals for the light beam 20 reflected at points $P_1$, $P_2$, $P_3$ and so on. The subsequent operation is the same as explained previously.

Figure 16B:
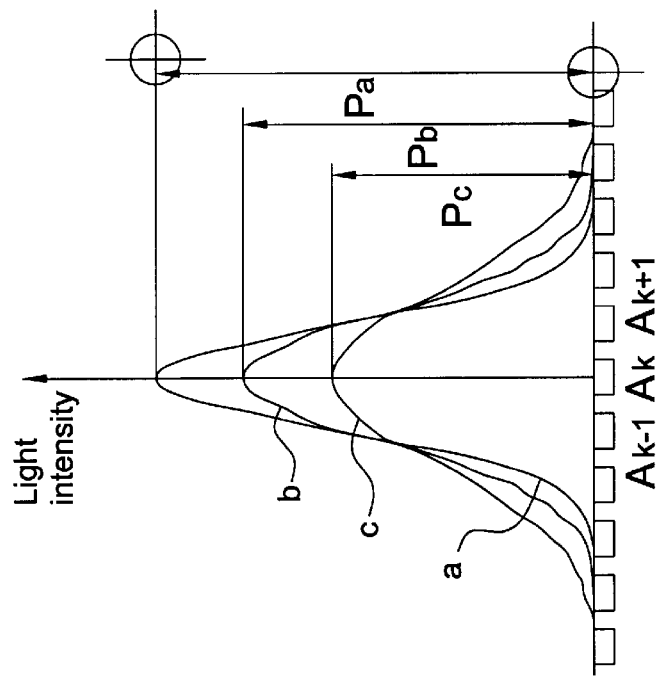
FIG. 16B is a diagram showing the intensity distribution of the incident light beam on the multi-split photosensor.
Figure 16A:
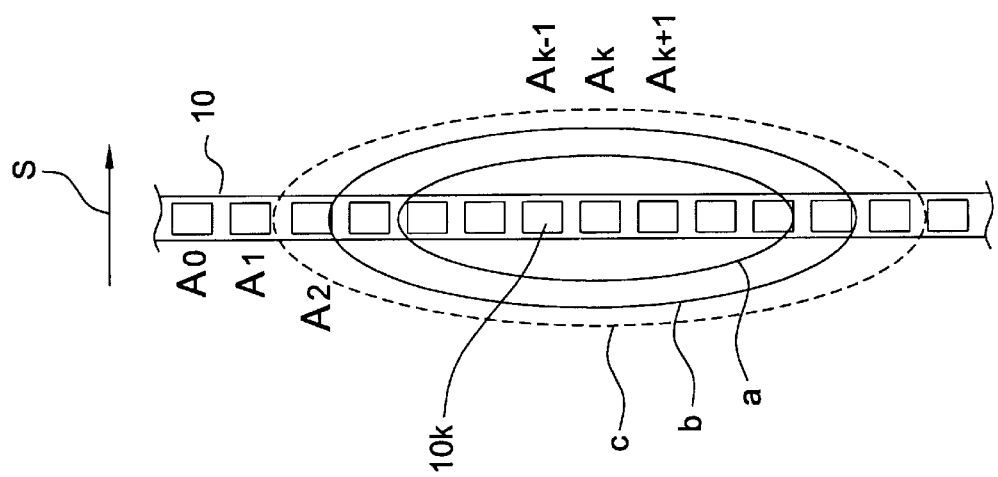
FIG. 16A is a diagram explaining the multi-split photosensor used in the light beam recording apparatus based on a fourth embodiment of this invention.

FIG. 16A shows the multi-split photosensor 10 used in the light beam recording apparatus based on the fourth embodiment of this invention. The photosensor 10 includes multiple opto-electric transducers 10k aligning at a prescribed interval in the subordinate scanning direction which is perpendicular to the main scanning direction S. The opto-electric transducers 10k are given individual addresses $A_0$, $A_1$, ..., $A_k$, and so on.

When the reflected beam a is incident to the multi-split photosensor 10, the light intensity Pa is detected by a transducer 10k with address Ak located at the center of the reflected beam a as shown in FIG. 16B. The light intensity Pa is compared with reference upper-limit and lower-limit values. The collimator lens 2 is moved toward the light source in response to the comparison result of the light intensity above the upper-limit value so that the far-focus state is corrected.

The light intensity Pb of the reflected beam b is compared with the reference values, and if it is within the range of the reference values, indicative of the in-focus state, the collimator lens 2 is kept stationary. The light intensity Pc of the reflected beam c is compared with the reference values, and if it is below the reference lower-limit value, the collimator lens 2 is moved away from the light source so that the near-focus state is corrected.

According to the inventive light beam focal position detecting device, light beam projecting device and light beam recording apparatus described above, in which the photosensor is dispose on the beam diverging side or converging side off the focal position, it becomes possible to detect the focal position error and shift direction. By placing the photosensor at a position on the beam diverging side or converging side where the beam diameter varies sharply, it becomes possible to detect the focal position error accurately. By using the photosensor elongated in the main scanning direction, it is possible to receive a sufficient amount of incident light and to detect the beam diameter in the subordinate scanning direction, and it eliminates the need of a high-response photosensor and control circuit. Based on the detection of the light beam at the outer section external to the highest light intensity section, it is possible to amplify the rate of variation of the incident light intensity on the photosensor, enabling the high-quality image formation intended for high-resolution image recording.

According to the inventive light beam focal position detecting device, light beam projecting device and light beam recording apparatus, in which a multi-split photosensor elongated in the subordinate scanning direction is employed, it is possible to detect accurately the focal position error attributable to environmental factors such as temperature variation and that caused by the eccentricity of the photosensitive drum, enabling the high-quality image formation intended for high-resolution image recording.

What is claimed is:

1. A light beam focal position detecting device for detecting a focal position of a light beam which is emitted by a light source and focused by a focusing optical system, said device comprising:

light beam detection means disposed on the optical path of said light beam, at a position where said light beam from said focusing optical system converges toward the focal position or at a position where said light beam diverges from the focal position, and adapted to receive said light beam and produce a signal which depends on a diameter of said light beam; and focal position detecting means which compares said beam diameter signal with a prescribed value and produces, based on the difference thereof, a focal position signal indicative of a positional relation of the focal position of said light beam with a prescribed focal position.

2. A light beam focal position detecting device according to claim 1, wherein said light beam detection means includes first and second light beam sensors which are disposed by being interposed by first and second prescribed spacings, respectively, from a main scanning line of said light beam and adapted to receive outer sections in cross section of said light beam on both sides of a central section.

3. A light beam focal position detecting device according to claim 2, wherein said first and second spacings are different from each other.

4. A light beam focal position detecting device according to claim 1, wherein said light beam detection means comprises at least one opto-electric transducer which produces an output signal depending on an area size of light reception.

5. A light beam focal position detecting device according to claim 1, wherein said focal position detecting means produces as said focal position signal one of a near-focus position signal indicative of the focal position of said light beam being nearer than said prescribed focal position to said light source, an in-focus position signal indicative of the focal position of said light beam being at said prescribed focal position, and a far-focus position signal indicative of the focal position of said light beam being farther than said prescribed focal position from said light source.

6. A light beam focal position detecting device according to claim 2, wherein said first and second prescribed spacings are different from each other.

7. A light beam focal position detecting device according to claim 2, wherein said first and second light beam sensors have different sensitivities to light.

8. A light beam focal position detecting device according to claim 2, wherein one of said first and second light beam sensors have an optical filter which attenuates incident light power.

9. A light beam focal position detecting device according to claim 2, wherein said first and second light beam sensors have a dimension along the main scanning line greater than an expected beam diameter.

10. A light beam focal position detecting device according to claim 4, wherein said light beam detection means comprises an array of opto-electric transducers which produce independent output signals.

11. A light beam projecting device comprising:

a light source which emits a light beam;

a focusing optical system which focuses said light beam at a prescribed focal position;

light beam detection means disposed on the optical path of said light beam, at one of a position where said light beam from said focusing optical system converges toward said prescribed focal position or the vicinity thereof and a position where said light beam diverges from said prescribed focal position or the vicinity thereof, and adapted to receive said light beam and produce a signal which depends on a diameter of said light beam;

focal position detecting means which compares said beam diameter signal with a prescribed value and produces, based on a comparison result, a focal position signal indicative of a positional relation of a focal position of said light beam with said prescribed focal position; and focal position adjusting means for adjusting the focal position of said focusing optical system in accordance with said focal position signal so that the focal position of said light beam coincides with said prescribed focal position.

12. A light beam recording apparatus comprising:

a light source which emits a light beam;

an optical system which focuses said light beam at a prescribed focal position and causes said light beam to scan across a prescribed main scanning range;

a recording medium which is located in said prescribed main scanning range and has a region to be exposed to said light beam located at said prescribed focal position;

light beam detection means disposed on the optical path of said light beam, at one of a position where said light beam from said optical system converges toward said prescribed focal position or the vicinity thereof and a position where said light beam diverges from said prescribed focal position or the vicinity thereof, and adapted to receive said light beam and produce a signal which depends on a diameter of said light beam;

focal position detecting means which compares said beam diameter signal with a prescribed value and produces, based on a comparison result, a focal position signal indicative of a positional relation of a focal position of said light beam with said prescribed focal position; and focal position adjusting means for adjusting the focal position of said optical system in accordance with said focal position signal so that the focal position of said light beam coincides with said prescribed focal position.

13. A light beam recording apparatus according to claim 12, wherein said light beam detecting on means comprises a mirror which reflects said light beam before it is projected to said recording medium, and a light beam sensor which receives the light beam reflected by said mirror and produces said beam diameter signal.

14. A light beam recording apparatus according to claim 12, wherein said focal position adjusting means comprises a relative position adjusting means which adjusts a relative positional relation among said light source, said optical system and said recording medium, and control means which controls driving of said relative position adjusting means in accordance with said focal position signal.

15. A light beam recording apparatus comprising:

a light source which emits a light beam;

an optical system which focuses said light beam at a prescribed focal position and causes said light beam to scan across a prescribed main scanning range;

a recording medium which is located in said prescribed main scanning range and has a region to be exposed to said light beam located at said prescribed focal position;

multi-split light beam detection means disposed on an optical path of said light beam which is reflected by said recording medium, at a position where said light beam from said optical system diverges after it has converged at a focal position, made up of a prescribed number of light beam sensing elements arrayed in a subordinate scanning direction which is perpendicular to the main scanning direction of said light beam, and adapted to receive said light beam and produce a signal which depends on a diameter of said light beam;

focal position detecting means which receives said beam diameter signal, compares it with a prescribed value to detect the focal position of said light beam, and produces, based on a detection result, a focal position signal indicative of a positional relation of the focal position of said light beam with said prescribed focal position; and focal position adjusting means for adjusting the focal position of said optical system in accordance with said focal position signal so that the focal position of said light beam coincides with said prescribed focal position.

16. A light beam recording apparatus according to claim 15, wherein said multi-split light beam detection means produces said beam diameter signal which depends on the number of light beam sensing elements that have received said light beam.

17. A light beam recording apparatus according to claim 15, wherein said multi-split light beam detection means selects an output signal having a maximum value among output signals of said light beam sensing elements, and produces said beam diameter signal which depends on said maximum output signal.

* * * * *